C. H. HAPGOOD.
WEIGHING SCALE.
APPLICATION FILED JAN. 25, 1915.

1,285,141.

Patented Nov. 19, 1918.

WITNESSES:
D. C. Walter
Carl J. Pinkle

INVENTOR.
Clarence H. Hapgood
by George R. Frye
ATTORNEY

C. H. HAPGOOD.
WEIGHING SCALE.
APPLICATION FILED JAN. 25, 1915.
1,285,141.
Patented Nov. 19, 1918.
2 SHEETS—SHEET 2.
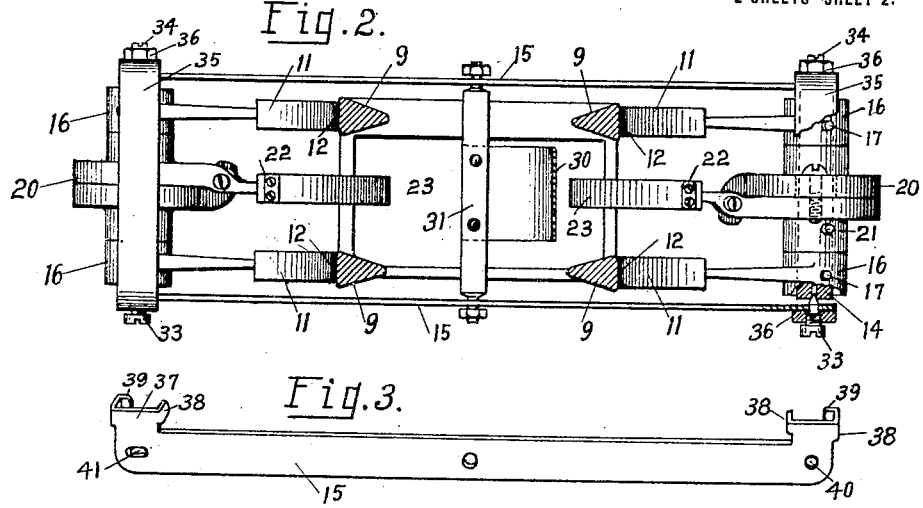
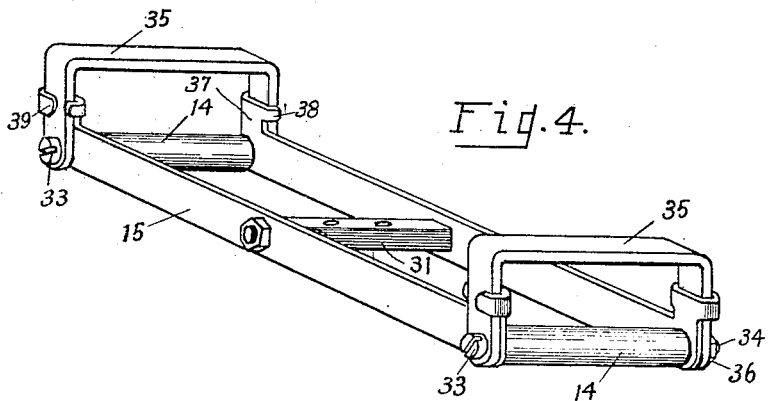
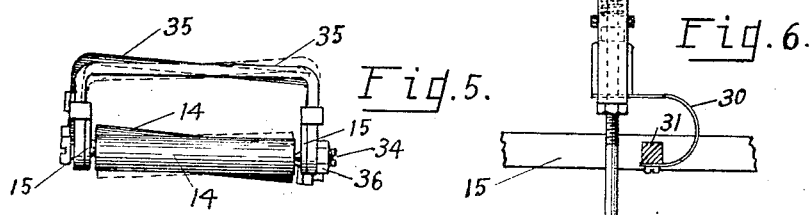
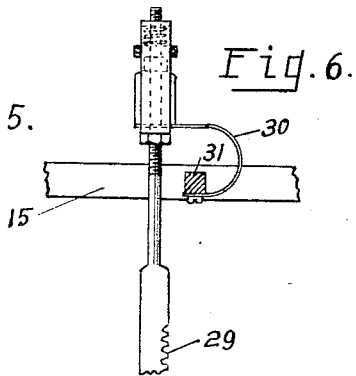
WITNESSES:
D. C. Watter
Carl J. Pinke
INVENTOR.
Clarence H. Hapgood
by George R. Frye
ATTORNEY

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING-SCALE.

1,285,141.  Specification of Letters Patent.  Patented Nov. 19, 1918.

Application filed January 27, 1915. Serial No. 4,652.

*To all whom it may concern:*

Be it known that I, CLARENCE H. HAPGOOD, a citizen of the United States, residing at Toledo, in the county of Lucas and State of Ohio, have invented new and useful Improvements in Weighing-Scales, of which the following is a specification.

My invention relates to weighing scales and more particularly to that type of weighing scales known as pendulum scales.

One characteristic of pendulum scales is that in order to secure accurate weighing it is necessary that the scales be leveled or adjusted with reference to the vertical, otherwise the zero marking on the scales does not correspond with the true zero position of the pendulum and index-hand, and correct indication of the weights of articles weighed is impossible. In order to overcome this difficulty it has been proposed to use a pair of pendulums so connected and jointly affecting the weight indications that any aberration or derangement of one pendulum caused by the displacement of the scale from its proper position with relation to the vertical will be offset by the corresponding aberration of the other pendulum.

The object of my invention is primarily to improve scales of this character by increasing the accuracy of indication and diminishing their liability to error by providing novel self-adjusting means for connecting the pendulum with the indicating mechanism, whereby provision is made for allowing a reasonable derangement of the pendulum and the pendulum-supporting means in any direction without disturbing the accuracy of the indicating mechanism.

A further object of this invention is to so construct a flexibly-connected self-adjusting frame for connecting the indicating mechanism with the pendulum that the pivot points upon which the opposite ends of the pendulum shafts are pivotally mounted will at all times and under all reasonable working conditions be free and in alined positions, permitting the unrestricted rocking of the pendulums in their load-off-setting movements.

With the above and incidental objects in view, which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention, and wherein similar reference numerals designate similar parts throughout the several views.

In the drawings:—

Fig. 2 is a section on the line 2—2 of Fig. 1, with parts broken away.

Fig. 3 is a detail perspective view of one of the cross-bars forming a part of the flexibly-connected self-adjusting frame.

Fig. 4 is a detail perspective view of the frame in its assembled relation.

Fig. 5 is an end view of the frame showing in full lines the normal position of the U-shaped end-pieces thereof, and in dotted lines a distorted position that may be assumed by the end-pieces without affecting the accuracy of the scale, and Fig. 6 is a detail enlarged view of the connection between the indicating mechanism and the flexible frame.

Figure 1:
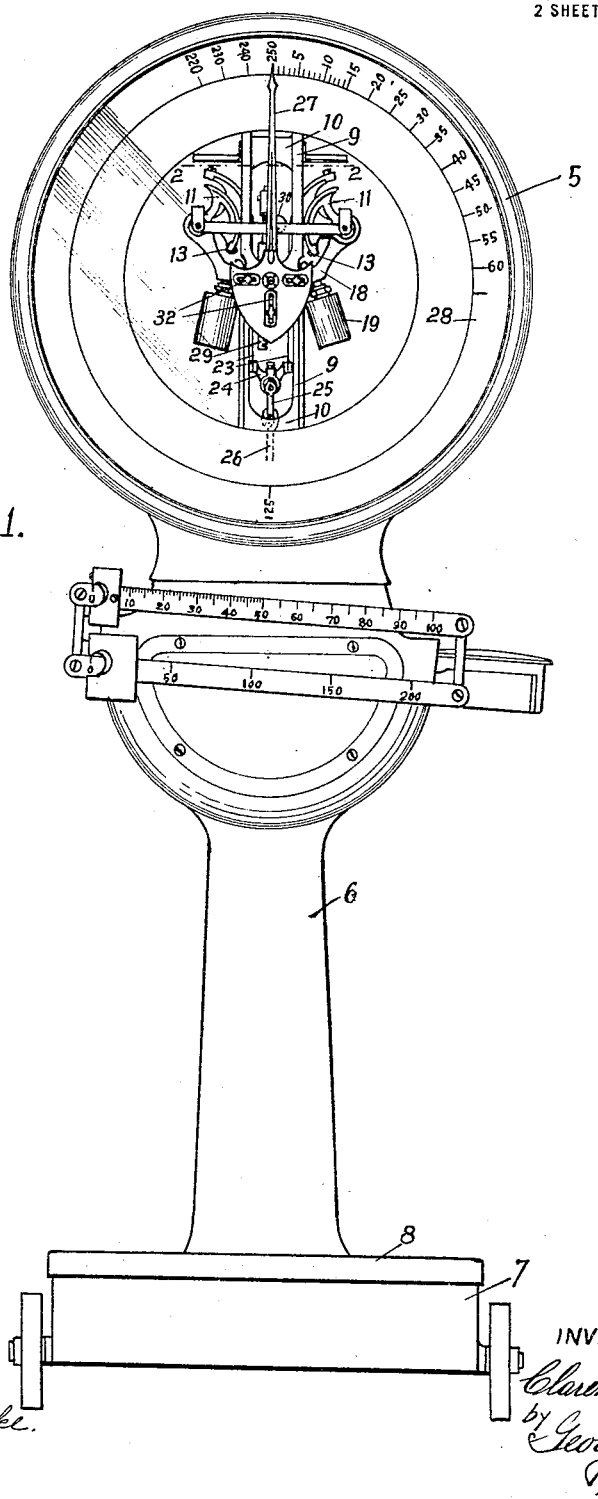
Figure 1 is a front elevation of a portable platform scale embodying my invention.

In the drawing, 5 designates a scale housing adapted to inclose the weighing mechanism of the scale and supported upon a suitable column 6, the lower end of which is associated with the base 7 of the scale inclosing the platform-levers supporting the scale platform 8. The weighing mechanism of the scale herein shown comprises a rectangular frame having four vertical pillars 9 suitably supported from the wall of the scale housing and secured together at the top and bottom by cross-pieces 10. The pillars 9 form bearings or tracks for rocker segments 11 which have rolling contact thereon, being supported in position by flexible ribbons 12 of steel or other suitable metal fastened to the lower ends of the segments, as at 13, and at their upper ends to the pillars, being thus interposed between the pillars and the segments at every position of the latter. The segments 11 are secured upon shafts 14 and the two shafts are connected together by cross-bars 15, formed substantially as shown in Fig. 3, the segment shafts and cross-bars forming a rectangular frame flexibly-connected and capable of automatic adjustment as hereinafter more fully described. The segments 11 are formed with hub portions 16 which are fixed, as by the dowel pins 17, adjacent the opposite ends of the shafts 14, as clearly shown in Fig. 2, and from each hub 16 of the segments depends a pendulum consisting of a bent arm 18 and a weight 19, the normal position of the pendulums being as shown in Fig. 1 of the drawings. The segments 11 are four in number, there being a pair upon each side of the rectangular frame, the hub members of each pair being secured adjacent the ends of a common shaft 14.

Intermediate the members of each pair of supporting segments 11 is a somewhat larger segment 20 which is also fixed, as by the dowel pins 21, to the shafts 14, said segment extending at its periphery between the pillars upon the same side of the rectangular frame and connected at its upper end, as at 22, to a metallic ribbon 23 which extends over the arcuate face of the segment and is attached at its lower end to an equalizer bar 24. The construction on both sides of the weighing mechanism is the same, and the ribbons 23 being attached to opposite ends of the equalizer bar 24 which is pivotally connected to a link 25, if the scale be slightly tilted in the plane of the face of the dial and both pendulums thereby shifted in the same direction it will have no effect upon the position of the link 25, since the amount of ribbon taken up upon one segment will be compensated by that given up by the other, the equalizer bar tilting slightly to adjust itself to the unequal working lengths of the ribbons. The equalizer bar is suitably connected through the link 25 and the hook-rod 26 to the platform levers (not shown) supporting the scale platform 8. It is to be understood that any suitable platform and platform-lever mechanism may be employed in connection with the weighing mechanism of the scale, the weighing mechanism herein shown being designed to satisfactorily operate when employed in various forms of scales, as, for example, in dormant, portable or hanging scales.

An indicator hand 27 is pivoted concentric with the indicator dial 28 and the casing 5 and is revolved from the side-bars 15 of the rectangular frame by a vertically-disposed rack 29 attached by a resilient connecting member 30 to the bar 31 pivotally mounted in the side-bars 15 substantially centrally of the length thereof. The rack 29 is in mesh with a pinion (not shown) mounted on the journal of the indicator hand. The hand is preferably formed of sheet metal and adjacent its pivoted point is expanded into a plate which is appropriately slotted, as at 32, to receive small adjustable weights for accurately counter-balancing the hand. The resilient connecting member 30 is preferably connected to the bar 31 adjacent the center thereof, and the ends of the bar 31 are formed as trunnions loosely fitting in openings in the centers of the side-bars 15.

In the embodiment herein shown, the pendulum shafts 14 are pivotally mounted upon pivots 33 and 34, having cone-shaped pivot points (see Fig. 2) and adjustably mounted in the legs of the U-shaped end-pieces 35 of the flexible supporting frame. The pivots 33 are herein shown as shoulder screws threaded into apertures in the legs of the U-shaped end-pieces 35, while the pivots 34 may take the form of headless screws, suitable lock-nuts 36 being utilized to maintain the desired adjusted position of these headless pivots.

The side-bars 15 are preferably formed substantially as shown in Fig. 3, each having a straight elongated body portion with upturned arms 37 at its opposite ends, the upturned arms being adapted to lie closely against the U-shaped end-pieces 35, as shown in Fig. 4, and are provided with suitable lugs 38 bent to extend across the edges of the U-shaped end-pieces though not in contact therewith, allowing a shifting of the side-bars relatively to the end-pieces while aiding in maintaining these end-pieces 35 in an upright position, one of said lugs 38 being provided with an inturned extension 39 adapted to lie against the outside face of the U-shaped end-pieces (see Fig. 4). Adjacent one end each of the side-bars 15 is provided with an aperture 40 of slightly greater diameter than the diameters of the pivots 33 and 34, while adjacent its opposite end each side-bar is provided with an elongated slot 41 (see Fig. 3). In the assembly of the scale the pivots 33 are suitably threaded within the legs upon one side of the U-shaped end-pieces 35 and are then passed through the aperture 40 and the slot 41 respectively of one of the side-bars 15, the cone-shaped pivot points being then brought into engagement with the bearings upon one end of the pendulum shafts 14, after which the opposite side-bar 15 is arranged in position adjacent the opposite legs of the end-pieces 35 and the headless pivots 34 extended through the apertures in the said end-pieces and through the aperture 40 and the slot 41 of this second side-bar into engagement with the bearings of the opposite ends of the pendulum shafts 14. The desired adjustment of said pivots 33 and 34 being secured, the lock-nuts 36 are screwed down into locking position. This arrangement of the side-bars 15 and the end-pieces 35 relatively to the pendulum shafts 14 permits of a flexible self-adjusting support whereby the pendulum shafts 14 can separate to a slight extent, the pivots supporting one of said shafts 14 moving within the elongated slots 41 at one end of the side-bars 15.

This flexible frame connecting the shafts 14 of the pendulums allows of a reasonable derangement of the assembled parts of the weighing mechanism of the scale in any direction, the lifting of one pendulum above its normal position when the scale is level being compensated for by a corresponding falling of the other pendulum, and a twisting of the frame to an extent such as is shown in Fig. 5 of the drawings, merely elevating one end of one of the side-bars 15, while the adjacent end of the opposite sidebar is lowered, without binding the pivots in the pendulum shafts 14 or affecting the free and unrestricted rocking of the pendulums when a pull is exerted upon the equalizer bar 24, as when a load is placed on the scale platform.

Also, it is to be particularly noted that the connection of the rectangular frame with the indicating mechanism of the scale is unaffected by the shifting of the pendulum shafts 14 due to any of the deformations of the frame mentioned above, the tilting of the side-bars 15 as when one pendulum shaft is elevated and the other shaft correspondingly lowered, or the deformation of the rectangular frame as shown in Fig. 5, resulting in the lifting of one end of one sidebar while the adjacent end of the other sidebar is lowered, merely rocking the side-bars of the flexible frame on the trunnions of the central-bar 31 of the frame, through which connection is made to the indicating mechanism of the scale, this central-bar 31 being at all times and under all conditions in the same position as long as no pull is exerted on the equalizer-bar 24.

When a pull is exerted on the equalizer-bar 24, as when a load is placed on the scale platform the pendulums are rocked simultaneously to offset the weight of the load, the segments 11 advancing along the ribbons 12 supported by the pillars 9 and the pendulum shafts 14 being correspondingly elevated as the segments advance, the elevation of the pendulum shafts carrying the rectangular frame upward. The upward movement of the rectangular frame elevates the central-bar 31 and the rack 29 carried thereby, the movement of the rack rotating the pinion meshing therewith and the indicator-hand through an appropriate arc to indicate on the dial 28 the weight of the load on the platform. When the load is removed from the platform, the falling of the weights 19 of the pendulums will cause the return of the rectangular frame and the parts associated therewith to their original position.

While it will be apparent that the illustrated embodiment of my invention herein shown is well calculated to adequately fulfil the objects of the invention primarily stated, it will be understood that the construction is susceptible to modification without departing from the spirit and scope of the invention as set forth in the following claims.

Having described my invention, I claim:—

1. In a scale, the combination of indicating mechanism, weighing mechanism including a pair of pendulums, and a rectangular frame of flexibly connected parts for connecting the pendulums with the indicating mechanism.

2. In a scale, the combination of indicating mechanism, weighing mechanism including a pair of pendulums provided with rocker segments, guides for the segments in their rocking movement, and a frame composed of parts loosely connected to each other for connecting said pendulum segments with the indicating mechanism.

3. In a scale, the combination of indicating mechanism, weighing mechanism including a pair of pendulums provided with rocker segments, guides for the segments in their rocking movement and a flexibly-connected rectangular frame for connecting said segments with said indicating mechanism.

4. In a scale, the combination of indicating mechanism, weighing mechanism including a pair of pendulums provided with rocker segments, guides for the segments in their rocking movement and a flexible frame having side-bars and end-pieces loosely connected together for connecting said segments with said indicating mechanism.

5. In a scale, the combination of indicating mechanism, weighing mechanism including a pair of pendulum shafts and a pair of pendulums mounted thereon, and a flexible frame for connecting said pendulum shafts with said indicating mechanism, said frame comprising side-bars and end-pieces arranged substantially parallel with said pendulum shafts and loosely connected with said side-bars.

6. In a scale, the combination of indicating mechanism, weighing mechanism including a pair of pendulum shafts and a pair of pendulums mounted thereon, and a flexible frame for connecting said pendulum shafts with said indicating mechanism, said frame comprising U-shaped end-pieces in the legs of which the pendulum shafts are pivotally mounted and side-bars loosely connected with said end-pieces.

7. In a scale, the combination of indicating mechanism, weighing mechanism including a pair of pendulum shafts and a pair of pendulums mounted thereon, and a flexible frame for connecting said pendulum shafts with said indicating mechanism, said frame comprising U-shaped end-pieces in the legs of which the pendulum shafts are pivotally mounted and side-bars loosely connected with said end-pieces, each of said side-bars having an elongated slot adjacent one end thereof.

8. In a scale, the combination of indicating mechanism, weighing mechanism including a pair of pendulum shafts and a pair of pendulums mounted thereon, and a flexible frame for connecting said pendulum shafts with said indicating mechanism, said frame comprising U-shaped end-pieces in the legs of which the pendulum shafts are pivotally mounted and side-bars loosely connected with said end-pieces, and a central bar pivotally mounted in said side-bars and connected with the indicating mechanism.

9. In a scale, the combination of indicating mechanism, weighing mechanism including a pair of pendulum shafts and a pair of pendulums mounted thereon, a flexible frame for connecting said pendulum shafts with said indicating mechanism, said frame comprising U-shaped end-pieces arranged with their body portions substantially parallel with said pendulum shafts, side-bars loosely connected with said end-pieces and said pendulum shafts, and a central-bar pivotally mounted in said side-bars and connected with the indicating mechanism.

10. In a scale, and in combination with the weighing and indicating mechanisms thereof, means for connecting the weighing and indicating mechanisms including a flexible self-adjusting frame comprising end-pieces and side-bars loosely connected therewith, said side-bars having an aperture adjacent one end and an elongated slot adjacent the opposite end thereof.

11. In a scale, and in combination with the weighing and indicating mechanisms thereof, means for connecting the weighing and indicating mechanisms including a flexible frame comprising U-shaped end-pieces having adjustable pivots arranged in the legs thereof and side-bars having apertures adjacent their opposite ends, the walls of which loosely surround said pivots.

12. In a scale, and in combination with the weighing mechanism thereof, a flexible frame comprising end-pieces, side-bars connecting the opposite ends thereof, each side-bar being formed with an aperture adjacent one end and an elongated slot adjacent the opposite end thereof, and adjustable pivots extending through the apertures and slots of the side-bars and carried by the said end-pieces.

13. In a scale, the combination of indicating mechanism including a rack and a resilient connecting member secured to the upper end thereof, weighing mechanism including a pair of pendulums, and a flexible frame for connecting said pendulums with said indicating mechanism, said frame comprising U-shaped end-pieces in the legs of which the pendulums are pivotally mounted and side-bars loosely connected with said end-pieces, and a central-bar pivotally mounted in said side-bars and connected with the resilient connecting member of the indicating mechanism.

CLARENCE H. HAPGOOD.

Witnesses:
ELIZABETH LAZARES,
C. WM. FESSENDEN.

Copies of this patent may be obtained for five cents each, by addressing the "Commissioner of Patents, Washington, D. C."